United States Patent [19]
Fujiki et al.

[11] Patent Number: 5,534,305
[45] Date of Patent: Jul. 9, 1996

[54] WOOD PROCESSING COMPOSITION, PROCESSED WOOD AND A METHOD OF PROCESSING WOOD

[75] Inventors: Satoshi Fujiki, Fukuoka; Hideo Kamata, Akita, both of Japan

[73] Assignee: Az Company, Fukuoka, Japan

[21] Appl. No.: 299,038

[22] Filed: Aug. 31, 1994

Related U.S. Application Data

[63] Continuation of Ser. No. 952,868, filed as PCT/jp92/00406, Apr. 2, 1992 published as WO92/17347, Oct. 15, 1992, abandoned.

[30] Foreign Application Priority Data

Apr. 4, 1991 [JP] Japan .................................. 3-071685
Sep. 20, 1991 [JP] Japan .................................. 3-241969

[51] Int. Cl.⁶ .............................. C08L 61/20; C08L 77/06
[52] U.S. Cl. ...................... 427/393; 427/393.3; 252/403; 525/427; 525/428
[58] Field of Search ............................... 427/393, 393.3, 427/397; 106/18.13, 18.14, 18.21; 428/541, 921; 252/607, 183.12, 183.13, 383, 403; 525/420, 427, 428

[56] References Cited

U.S. PATENT DOCUMENTS

| | | |
|---|---|---|
| 2,085,492 | 6/1937 | Ellis . |
| 2,917,408 | 12/1959 | Goldstein et al. ...................... 427/297 |
| 3,159,503 | 12/1964 | Goldstein et al. ...................... 427/397 |
| 3,887,511 | 6/1975 | Juneja ................................. 260/29.4 R |
| 3,986,881 | 10/1976 | Oberley ..................................... 106/15 |
| 4,165,305 | 8/1979 | Sundie et al. .......................... 260/29.4 |
| 4,224,169 | 9/1980 | Retana .................................. 106/18.13 |
| 4,268,649 | 5/1981 | Jellinek et al. ........................ 153/335 |
| 4,276,329 | 6/1981 | Vasishth et al. ........................ 427/393 |
| 4,285,997 | 8/1981 | Vasishth et al. ........................ 427/393 |
| 4,373,010 | 2/1983 | Oberley ................................... 427/397 |
| 4,433,120 | 2/1984 | Chiu ........................................ 427/393 |
| 4,461,720 | 7/1984 | Loyvet et al. ........................... 427/393 |
| 4,552,803 | 11/1985 | Pearson ................................... 427/393 |
| 4,585,703 | 4/1986 | Taguchi et al. ......................... 427/393 |
| 4,731,265 | 3/1988 | Hirao et al. ............................. 427/440 |
| 4,832,987 | 5/1989 | Ueda et al. .............................. 427/397 |
| 4,963,398 | 10/1990 | Deho ....................................... 427/397 |
| 4,992,307 | 2/1991 | Ikeda ...................................... 427/297 |
| 5,071,682 | 12/1991 | Moore ..................................... 427/393 |

FOREIGN PATENT DOCUMENTS

| | | |
|---|---|---|
| 49-30507 | 3/1974 | Japan . |
| 63-51105 | 3/1988 | Japan . |
| 63-199603 | 8/1988 | Japan . |
| 63-231902 | 9/1988 | Japan . |
| 2-8002 | 1/1990 | Japan . |
| 2-45103 | 2/1990 | Japan . |
| 2-98403 | 4/1990 | Japan . |

*Primary Examiner*—Diana Dudash
*Attorney, Agent, or Firm*—Jordan and Hamburg

[57] ABSTRACT

A wood processing composition comprising a dimensional stabilizer which penetrates wood and restrains its swelling and shrinkage to prevent cracking and to give it dimensional stability, and a hardening filler composed of synthetic resins which hardens after penetrating wood to prevent the dimensional stabilizer from flowing away from said wood, fills the cavity of the wood to restrain its shrinkage, and protects the wood against decay and damage by termites. It preferably further contains a flame retardant consisting of at least one of a phosphoric acid compound and dicyandiamide, and a water-soluble flame-retardant solution containing urea and a 37% aqueous solution of formaldehyde by weight. Wood is impregnated with the composition by appropriate means and, after drying, it may be impregnated with a surface reinforcing synthetic resin. The wood as processed is free of any unnatural color, is harmless, and retains a durable surface which is characteristic of wood.

1 Claim, No Drawings

1

WOOD PROCESSING COMPOSITION, PROCESSED WOOD AND A METHOD OF PROCESSING WOOD

This application is a continuation of application Ser. No. 07/952,868, filed as PCT/JP92/00406, Apr. 2, 1992 published as WO92/17347, Oct. 15, 1992, now abandoned.

FIELD OF ART

This invention relates to a composition for treating wood to prevent cracking, give it dimensional stability, protect it against decay and damage by termites and render it nonflammable, as well as to processed wood obtained by treatment with the same, and to a method of processing wood.

BACKGROUND OF THE INVENTION

An aqueous solution of CCA (a wood preservative composed of chromium, copper and arsenic) and creosote oil have been typical of the chemicals used for protecting wood against decay and damage by worms to increase its durability.

These chemicals are good preservatives, but have no property that protects wood from cracking. Wood treated with such chemicals is very likely to crack and split, as any untreated wood is.

It is impossible within the range of practically available techniques to make any such chemical uniformly impregnate the center of a piece of wood sized for practical use such as for a building, e.g., a square block of wood or a wooden brick. The interior of a piece of wood remains for the greater part untreated, and as a crack will allow rainwater, rotting fungi, etc. to enter, it will have a decayed interior despite its sound outward appearance, and will therefore offer unexpectedly low durability.

CCA is regarded as a harmful substance, since it is a highly toxic chemical which develops a green color, and there are even regions where its use is prohibited. Such problems with CCA are pointed out in Japanese Patent Laid-Open Application (KOKAI) under No. 63-199603.

Creosote oil has only a low degree of permeation into wood having a high water content, since it is lipophilic and hydrophobic. It also has the disadvantage of leaving a post-treatment residue, a black oily substance which may stain clothes, etc.

Japanese Patent Laid-Open Application (KOKAI) under No. 63-231902 describes a method of improving the drawbacks of wood, i.e., liability to decay, flammability, and dimensional instability, which comprises impregnating wood with an organic substance (e.g., barium chloride, or boric acid in an aqueous solution), and simultaneously or separately coating or impregnating it with a resin (e.g. a urea resin, or polyethylene glycol methacrylate). These chemicals and processing methods, however, enable impregnation only through the surface layer of wood, and are incapable of permeating the center of a thick block of material, such as a wooden brick.

Compounds such as polyethylene glycol permeate wood easily because of their high power ability to absorb water, but are also very likely to flow away, and are therefore defective from a durability standpoint. A previous invention made by the inventors of the present invention, described in Japanese Patent Laid-Open Application (KOKAI) under No. 2- 98403, employs an organic solvent and a curable synthetic resin in combination with a dimensional stabilizer. The use of an organic solvent, however, calls for the full drying of the material to be impregnated, and the material is likely to crack during its drying.

For example, a wooden brick formed from a material with a core and having a high water content shrinks so heavily as it is dried that, upon drying, it may have a large open crack. Such a large crack mars the appearance of the brick not only before, but also after its use for a particular purpose in construction, and is also detrimental to its durability. The susceptibility to cracking and low durability of wooden bricks lower their evaluation and obstruct the growth of their use despite the various advantages that they have as wood products.

The conventional methods have therefore been applicable only to thin sheets of wood to be superposed on, and bonded to a surface, e.g. plywood.

Compounds of phosphoric acids such as ammonium phosphates and guanidine phosphates, and dicyandiamide are examples of known flame retardants for wood. These flame retardants, however, have the drawback of being low in the property of giving dimensional stability to wood, allowing it to crack. Dimensional stabilizers, such as polyethylene glycol, are flammable, and cannot be used with any flame retardant, since they exert a negative effect on the purpose for which the flame retardant is employed. They also have the drawback of flowing away easily from wood.

It is an object of this invention to overcome the drawbacks of the prior art as hereinabove pointed out, and to provide a composition for treating wood to prevent cracking, give it dimensional stability, protect it against decay and damage by termites and render it nonflammable, and to provide wood treated with the same. More particularly, it is an object of this invention to provide a wood processing composition and method which ensure that no cracking, etc. occurs even to a material having a high water content during its drying prior to treatment, thereby providing high quality processed wood.

DISCLOSURE OF THE INVENTION

To attain the above objects, the wood processing composition of this invention essentially comprises water as a solvent, a dimensional stabilizer which can effectively prevent wood from cracking and give it dimensional stability by virtue of both a swelling action and an appropriate moisture-retaining action, and a hardening filler composed of synthetic resins which, after impregnation into wood, hardens to prevent the dimensional stabilizer from flowing away from the wood, fills its cavity to restrain its shrinkage, and protects it against decay and damage by termites.

The processing method of this invention comprises the impregnation of wood with the wood processing composition by appropriate means, and includes impregnating it with a synthetic resin for reinforcing its surface, if required, after drying. "Appropriate means" refers to the use of a pressure-resistant vessel in which a reduced or elevated pressure is employed for impregnating wood with the composition, but does not preclude the use of any other means (e.g. a simple dipping method) that can effectively impregnate wood with the composition.

The dimensional stabilizer comprises a substance having the property of swelling the cells of wood and an appropriate moisture-retaining property, examples being basic inorganic compounds such as sodium hydroxide or calcium chloride, and an organic compound such as urea, polyethylene glycol (hereinafter referred to as "PEG") or polyethylene glycol methacrylate. These compounds are, however, hydrophilic, and are likely to exude or flow away if used alone. Ammonium phosphates, etc., which have not been known as dimensional stabilizers, have some dimensional stabilizing action if they are used with one or more of the above compounds, particularly urea.

The hardening filler is employed for penetrating wood with the dimensional stabilizer and for hardening upon drying of the wood, and may comprise, for example, a urea, phenolic, melamine, or alkyd resin. The melamine resin is, however, difficult to use, since it has a high viscosity and shrinks heavily upon hardening. The phenolic resin shrinks heavily upon hardening as well. Although this invention does not preclude the use of those resins, the urea resin (condensation product of urea and formalin) and the alkyd resin are preferred for use as the hardening filler.

The hardening filler comprises a mixture of the resins mentioned above, for example, a mixture in appropriate proportions of PEG and an alkyd resin and/or a mixture of urea and formalin, a commercial grade of formaldehyde. There is no limitation to the proportions of the constituents of the composition, provided that they are practically acceptable.

Referring by way of example to the proportions of the dimensional stabilizer and the constituents of the hardening filler in the composition, the final composition may contain 1 to 50% by weight of PEG. If it contains less than 1% of PEG, the wood will likely crack during drying after the impregnation, while if it contains 1% or more of PEG, the wood will become less likely to crack with each increase of PEG. The presence of more than 50% of PEG is practically undesirable, since the composition presents a number of problems including difficulty in drying, exudation after drying, and obstruction to the paint finish, though it may improve the cracking resistance and dimensional stability of the wood.

The composition may contain 2 to 40% by weight of alkyd resin. Less than 2% is insufficient to prevent the exudation of PEG. If the composition contains more than 40% of alkyd resin, it will not penetrate the wood sufficiently to achieve any desired impregnation. Moreover, the resin is likely to undergo sedimentation in the composition, particularly at low winter temperatures, which is undesirable from the standpoints of product quality and working efficiency.

The composition may contain 5 to 40% by weight of urea, and from an equal to double amount of formalin, a commercial grade of formaldehyde (in gram-molecular weight). If it contains less than 5% of urea, the urea will not fill the wood satisfactorily, and the wood will be easily and heavily deformed by shrinkage during drying after the impregnation. If the composition contains more than 40% of urea, a condensation product of urea and formalin, a commercial grade of formaldehyde will cause whitening on the surface of the wood after drying. In the event that urea is also used as the dimensional stabilizer, it will be naturally necessary to employ more urea than formalin, a commercial grade of formaldehyde.

The wood processing composition of this invention has a total solid content of 10 to 60% by weight.

Wood is impregnated with 10 to 100 parts by weight of the composition as a solid for 100 parts of absolute dry weight of wood.

Wood processed by the method of this invention can further be impregnated with a surface-reinforcing synthetic resin, if required. The surface-reinforcing synthetic resin can be selected from among such chemicals as urethane, acrylic, epoxy and alkyd resins. The urethane resin is preferred since it penetrates wood easily, allows it to retain its surface appearance, and improves its weatherability.

Appropriate means for impregnating the surface of wood with a reinforcing resin employ a slightly elevated pressure, but the invention does not preclude the use of any other means, e.g. dipping, if such means are practically feasible.

The wood to which this invention is applicable is of coniferous trees, such as cedars, red pines, larches, cypresses and hemlocks, or of broad-leaved trees, such as beeches, oaks, Betula maximo wicziana regel, chinquapins, lauans and apitong.

The processing method of this invention is applicable to wood in the form of a pillar, beam or board, or any other shape including a brick, or to a rectangular piece of wood not specifically limited in size or shape.

Wood not yet dried, but having a high water content, particularly a thin rectangular piece of wood having a large cut surface, cracks quickly and heavily upon drying. It is likely that the cut surface may begin to crack if it is left to stand for two or three hours after cutting. The composition of this invention easily penetrates wood having a high water content, since it is hydrophilic, has a low molecular weight, and is low in viscosity. Wood impregnated with the composition by appropriate means as hereinabove stated does not crack, even if it is subjected to forced drying by hot air. Wood which has once been dried can be subjected without cracking to repeated cycles of soaking in water and drying by hot air. This is apparently due to the swelling and appropriate moisture-retaining actions of PEG, the condensation of urea and formalin, a commercial grade of formaldehyde the filling and exudation-preventing action of the condensation product thereof, and the waterproofing and exudation-preventing actions of hardened particles of the alkyd resin or a hardened film thereof.

Wood which has been impregnated with the composition of this invention by appropriate means, and then dried, is superbly protected against decay and damage by termites as well. This is apparently due to the fungicidal action of formalin, a commercial grade of formaldehyde prior to its condensation with urea, the fact that an osmotic pressure makes the rotting fungi unable to take nutriments from the wood filled with and protected by PEG, the alkyd resin and the condensation product of urea and formalin, a commercial grade of formaldehyde and the fact that the termites cannot take nourishment from the composition and thereby damage wood, since they do not have in their intestines any enzyme for the digestion of the constituents of the composition.

Wood which has been impregnated with the composition of this invention by appropriate means does not have any unnatural color, is harmless, and retains a surface which is characteristic of wood.

It also permits the impregnation of its surface with a reinforcing curable synthetic resin, and the application of a paint by spray coating or by brush, as desired.

The composition of this invention may further contain a known preservative such as boric acid or borax, and a pigment or dye as a coloring agent.

Improvement in durability and surface reinforcement are particularly desired for wooden bricks, since they are used in places with harsh conditions in which they are exposed to wind, rain, or snow, the broiling heat of the sun, and constant foot traffic. The impregnation of the surface of a wooden brick with a cold-curing polyurethane resin by appropriate means enables an overall improvement in its durability, including surface hardness and water resistance, while providing a beautiful appearance without substantially depriving it of a characteristic wood surface.

The wood processing composition of this invention easily penetrates wood having a high water content, and treatment employing it will provide processed wood which is free of any unnatural color, is harmless, and retains a surface which is characteristic of wood. The processed wood is highly resistant to cracking, and therefore displays a pleasant appearance and excellent durability. It is also superbly protected against decay and damage by termites.

We, the inventors of this invention, have also found that the impregnation of wood with a mixture of urea and formalin, a commercial grade of formaldehyde containing an excess of urea, with (e.g.) a phosphoric acid compound, provides dimensional stability by virtue of the action of urea as a dimensional stabilizer, without the aid of any known dimensional stabilizer such as PEG, and enables the dimensional stabilizer to maintain a good dimensional stabilizing action over a long period of time without flowing away. This discovery forms a basis for an additional invention. The additional invention comprises impregnating wood with an aqueous solution containing a known flame retardant, such as a phosphoric acid compound, urea and formalin, a commercial grade of formaldehyde and drying it to form a condensation product of urea and formalin, a commercial grade of formaldehyde and hardening it to thereby produce nonflammable wood.

The flame retardant to be used for the purpose of the additional invention can be selected from among the known flame retardants derived from phosphoric acids, such as ammonium and guanidine phosphates, and mixtures of polyphosphoric acids and ammonia, and dicyandiamide. These have the property of rendering wood nonflammable.

Urea is water-soluble, easily available, and gives dimensional stability to wood. Moreover, it reacts with formalin, a commercial grade of formaldehyde to form a condensation product of urea and formalin, a commercial grade of formaldehyde (urea resin), which hardens under heat during drying and thereby prevents the excess urea and the phosphoric acid compound as the flame retardant from flowing away. An aqueous mixture of urea and, a commercial grade of formaldehyde is sufficiently low in viscosity to be easily injected into wood by any known injection method, though the use of an injection method employing a reduced or elevated pressure is preferable.

There is no particular limitation to the proportions of the constituents of the composition according to the additional invention, if they are practically acceptable. Referring to the preferred proportions, however, the proportion of e.g. ammonium phosphate may be in the range of 3 to 30% by weight, and the proportion of any other phosphoric acid compound may be substantially the same. The proportion of any phosphoric acid compound, however, depends on the degree of nonflammability which is desired. The preferred proportion of urea is from 10 to 30% by weight. If its proportion is less than 10% by weight, it will fail to exhibit a satisfactory dimensional stabilizing and filling action. If its proportion exceeds 30% by weight, the condensation product of urea and formalin, a commercial grade of formaldehyde will cause whitening on the surface of wood as it is dried. The preferred amount of, a commercial grade of formaldehyde is such that it reacts with approximately half of the urea employed.

Wood which has been impregnated with the composition according to the additional invention by appropriate means, and then dried, is free of any unnatural color, is harmless, and retains a surface which is characteristic of wood. The composition may further contain a known preservative, such as boric acid or borax.

DESCRIPTION OF THE PREFERRED EMBODIMENT

The invention will now be described with reference to examples.

EXAMPLE 1

Square wood having a core which had been prepared from Akita cedar obtained by thinning, 97 mm square and about 1900 mm long and with a water content of 80 to 120%, was cut crosswise into 97 mm square blocks having a thickness of 37 mm to provide samples.

Untreated samples were prepared by leaving a considerable number of square blocks to dry in the shade for a long period of time, selecting the blocks having no cracks, and impregnating the surfaces of the blocks with a reinforcing resin, since almost all of the blocks would have cracked if they had been left as they were.

Samples of this invention were wooden bricks obtained by impregnating square blocks with the wood processing composition of this invention by appropriate means immediately after cutting, then drying them and impregnating the surfaces thereof with a hardening filler.

More specifically, 10 parts by weight of PEG were dissolved in 40 parts by weight of water. Then, 10 parts by weight of a water-soluble alkyd resin were added, and 20 parts by weight of urea were dissolved, while the whole was fully mixed by stirring. 20 parts by weight of a 37% formalin, a commercial grade of formaldehyde solution were admixed to prepare a uniform composition to prevent the wood from cracking, to give it dimensional stability and to protect it against decay and damage by termites.

Square blocks or samples were placed in a cylindrical pressure-resistant vessel having a device for creating reduced pressure and elevated pressure, and the inside of the vessel was held at a reduced pressure in the order of, say, −700 mm Hg for about 30 minutes for wood degassing and other purposes.

Then, the composition was added into the vessel to soak the square block, and the inside of the vessel was held at an elevated pressure in the order of, say, 10 kg/cm$^2$ to cause the composition to impregnate the blocks. After this impregnation treatment, the composition was collected from the vessel, the vessel was opened, and the blocks were taken out. After the blocks had been dried by a hot-air drier at 60° C., they were immersed in a polyurethane resin, placed in the pressure-resistant vessel, and subjected to elevated-pressure impregnation treatment which was carried out by elevating the pressure prevailing in the vessel to 5 kg/cm$^2$. The blocks were taken out from the immersion tank, and left to stand at ambient temperature to allow the resin to cure and yield samples.

An insufficient pressure and length of pressure application was found to result in an insufficient depth of impregnation, while the application of too much pressure was found to result in excessive penetration of the composition, causing the wood to deform and crack.

The results of tests conducted on the untreated samples and the samples of this invention are shown in Tables 1 and 2.

Table 1 shows the results of the tests conducted to see whether or not any cracking would occur, by employing three cycles, each consisting of soaking the samples in water at ambient temperature for 24 hours to cause them to absorb water and expand, then drying them by a drier supplying hot air at 60° C. for 24 hours to cause them to contract, and a fourth cycle consisting of soaking them in water for seven days, and drying them with hot air at 60° C. for seven days.

Table 2 shows the results of the test conducted against decay in accordance with the "Method of testing the preservative effect of a wood preservative" as specified by JIS A 9302, and the results of the test conducted against damage by termites in accordance with the procedures of a test on the efficacy of a medicine, JTCAS No. 1 b(c), as approved by the Japanese Termite Countermeasure Association.

As is obvious from the test results shown in Tables 1 and 2, the wood treated with the composition of this invention displayed superb cracking resistance and dimensional stability, while also being protected against decay and damage by termites.

EXAMPLE 2

Eight thin blocks of cedar wood having a water content of 70 to 80%, 20 mm thick, 97 mm long and 97 mm wide, were immersed in a solution prepared by dissolving 400 g of urea and 150 g of polyphosphoric acid in 600 g of water, adding 300 g of a 25% aqueous solution of ammonia and 150 g of a 37% solution of formalin, a commercial grade of formaldehyde and dissolving 32 g of borax and 32 g of boric acid. The blocks were held at a reduced pressure (−700 mm Hg) for 30 min. and at an elevated pressure (10 kg/cm$^2$) for another 30 min. in a pressure-resistant vessel, whereby the solution was caused to penetrate the wood, while its water content was lowered to 40%. After about 16 hours of curing, the blocks were dried with hot air at 80° C. until they had a water content of 10 to 15%. There was no cracking or splitting at all.

EXAMPLE 3

Boards of cedar wood having a water content of 70 to 80%, 13 mm thick, 220 mm long and 220 mm wide, were immersed in a solution prepared by dissolving 300 g of urea and 150 g of polyphosphoric acid in 850 g of water, adding 100 g of guanidine phosphate and 100 g of ammonium phosphate, adding 300 g of the 25% aqueous solution of ammonia and 200 g of the 37% solution of formalin, a commercial grade of formaldehyde and dissolving 40 g of borax and 40 g of boric acid. The boards were held at a reduced pressure (−700 mm Hg) for 30 min. and at an elevated pressure (10 kg/cm$^2$) for another 30 min. in a pressure-resistant vessel, whereby the solution was caused to penetrate the wood to a rate of 40%. After about 16 hours of curing, the boards were dried with hot air at 80° C. until they had a water content of 10 to 15%. The wood as treated was found acceptable by a test on the surface of a nonflammable material as specified by No. 2 of Notice of the Ministry of Construction No. 1231 of 1976, and by the test on the toxicity of gas as specified by No. 4 of the same. When untreated and treated materials were dried until they had a water content of 15%, the untreated material showed a shrinkage of about 5 mm widthwise, but the treated material maintained its original dimensions without showing any appreciable shrinkage. Eight thin blocks having a water content of 70 to 80%, 20 mm thick, 97 mm long and 97 mm wide, were impregnated with the same solution, and dried with hot air at 80° C. There was no cracking or splitting at all.

The above examples are merely illustrative, and are not intended to limit numerically or otherwise the scope of this invention.

INDUSTRIAL FEASIBILITY

This invention can be utilized for processing building materials, materials for interior or exterior finish work, wooden tiles, etc. to render them nonflammable, to protect them against decay, and to give them dimensional stability.

TABLE 1

| Sample | Untreated product | Product of the invention |
|---|---|---|
| First cycle | | |
| Soaking in water (24 hrs) | | |
| Water absorption (%) | 57.1 | 3.2 |
| Dimensional change (%) | 2.08 | 0.22 |
| Drying (60° C., 24 hrs) | | |
| Water absorption (%) | 7.8 | 20.6 |
| Dimensional change (%) | −1.06 | 0.16 |
| Cracking | Yes | No |
| Second cycle | No further | |
| Soaking in water (24 hrs) | measure- | |
| Water absorption (%) | ment was | 3.6 |
| Dimensional change (%) | made | 0.40 |
| Drying (60° C., 24 hrs) | because of | |
| Water absorption (%) | cracking. | 23.9 |
| Dimensional change (%) | | 0.21 |
| Cracking | | No |
| Third cycle | | |
| Soaking in water (24 hrs) | | |
| Water absorption (%) | | 5.5 |
| Dimensional change (%) | | 0.42 |
| Drying (60° C., 24 hrs) | | |
| Water absorption (%) | | 25.5 |
| Dimensional change (%) | | 0.37 |
| Cracking | | No |
| Fourth cycle | | |
| Soaking in water (7 days) | | |
| Water absorption (%) | | 18.1 |
| Dimensional change (%) | | 0.72 |
| Drying (60° C., 7 days) | | |
| Water absorption (%) | | 19.6 |
| Dimensional change (%) | | 0.28 |
| Cracking | | No |

TABLE 2

|  |  | Average weight loss (%) | | | | Effect | | | |
|---|---|---|---|---|---|---|---|---|---|
|  | Sample Items | Untreated product | | Product of the Invention | | Product of the Invention | | Product treated with CCA | |
|  |  | Yes | No | Yes | No | Yes | No | Yes | No |
| Test against decay | Weathering treatment | | | | | | | | |
|  | Coriolellus Palustris | 41.7 | 30.2 | 0 | 0 | 100 | 100 | 98 | 100 |
|  | Coriolus versicolor | 19.3 | 13.9 | 0 | 0 | 100 | 100 | — | — |
| Test against damage by termites | Weathering treatment | | 40.8 | 6 | 4.0 | | | | |
|  | Death rate | | 10.0 | | | 88.4 | 93.2 | | |

What is claimed is:

1. A wood processing composition consisting essentially of 1–50% by weight of an aqueous solution of 20% by weight of polyethylene glycol; 2–40% by weight of an alkyd resin; 5–40% by weight of urea and 5–80% by weight of an aqueous solution of 37% formalin.

* * * * *